(12) United States Patent
Koshikawa et al.

(10) Patent No.: US 6,254,264 B1
(45) Date of Patent: Jul. 3, 2001

(54) LIGHTING SYSTEM FOR LIGHT GUIDES

(75) Inventors: Yutaka Koshikawa; Makoto Tomioka; Takayuki Suzuki, all of Hachioji; Akira Hasegawa, Musashino, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/310,378

(22) Filed: May 12, 1999

(30) Foreign Application Priority Data

May 13, 1998 (JP) .................................................. 10-146733

(51) Int. Cl.[7] ....................................................... F21V 8/00

(52) U.S. Cl. .......................... 362/558; 362/551; 362/263; 362/560

(58) Field of Search ..................................... 362/558, 560, 362/552, 263, 551

(56) References Cited

U.S. PATENT DOCUMENTS

| | | | | |
|---|---|---|---|---|
| 5,574,328 | * | 11/1996 | Okuchi | 362/263 X |
| 5,755,505 | * | 5/1998 | Hiramatsu | 362/263 X |
| 5,918,974 | * | 7/1999 | Suzuki et al. | 362/560 |
| 5,924,792 | * | 7/1999 | Cassarly et al. | 362/558 X |

* cited by examiner

*Primary Examiner*—Laura K. Tso
(74) *Attorney, Agent, or Firm*—Arnold International; Bruce Y. Arnold

(57) ABSTRACT

An apparatus and method is disclosed which stabilizes the light incident a light guide end over a guaranteed operating lifetime of a lamp used to illuminate the light guide end. The apparatus and method minimize variation in illumination incident a light guide end without, for example, controlling the electrical input to the lamp. The invention is especially effective for light guides having a narrow outer diameter, and compensates not only for movement of a region of maximum luminosity, as occurs in lamps where the cathode is partially consumed during operation of the lamp, but also for the lamp luminosity decreasing with age.

14 Claims, 5 Drawing Sheets

LIGHTING SYSTEM FOR LIGHT GUIDES

BACKGROUND OF THE INVENTION

Endoscopes often have light guides of various diameters that may be selectively attached to a single lighting system. Thus, it is desirable to have a lighting system for light guides be capable of efficiently illuminating light guides that cover a range of diameters from narrow to wide. Further, it is desirable for such a lighting system to be capable of inputting a large quantity of light to the attached light guide so as to provide a bright illumination for the endoscope.

An arc-discharge type lamp, such as a xenon lamp or a metal halide lamp, is generally used as a light source for inputting illuminating light to a light guide of an endoscope. Such a lamp is formed by sealing two electrodes (an anode and a cathode) as well as an arc-discharge gas within a transparent enclosure, such as a heat-resistant glass material. The light emission region between the two electrodes has a light emission area of spatially finite size. In order to gather light that is radiated from the arc-discharge area in various directions onto an end of the light guide, a reflector is generally arranged so as to partially surround the electrodes. Moreover, the reflector may be provided as an integral component of the lamp and thus serves as one section of the transparent cover of the lamp. An arrangement wherein the reflector reflects light emitted by an arc-discharge directly onto the end of the light guide may provide a sufficient illumination for an endoscope when a light guide of large diameter is used with the endoscope.

When a light guide having a "narrow" (herein defined as 3 mm or less) diameter is to be used with an endoscope, the lighting system for light guides in such a case conventionally arranges a condenser lens between the lamp and the end of the light guide in order to condense the light reflected by the reflector into a smaller region, thereby enabling the entire region of condensed light to be incident onto the narrow end of the light guide. However, it has been found that there is a remarkable deterioration over the life of the lamp in the amount of light that is input to an end of a light guide in the case where the outer diameter of the light guide is 3 mm or less.

FIG. 7 illustrates the amount of light incident on an end of a light guide of narrow diameter as a function of time for an arc-discharge lamp source as the lamp ages. As illustrated in the figure, the quantity of incident light on the light guide end decreases rapidly at first, and then decreases more gradually with increasing age of the lamp. What is believed to be the primary reason for this decrease will now be explained with reference to FIG. 6.

FIG. 6 is a graph which shows the brightness of light emitted by an arc-discharge lamp as a function of position along a line between the two electrodes for a direct current, arc-discharge type lamp. The shape and position of the anode 11 and cathode 12 are illustrated below abscissa of the graph. As is apparent from FIG. 6 a luminescent region having the highest intensity (marked by slanted lines in the figure) occurs adjacent the portion of the cathode 12 that is nearest the anode. This luminescent region will herein be termed the "hot spot", and the portion of the cathode nearest the anode will herein be termed the "tip" of the cathode. It is believed that an important reason for the decrease in light intensity with time (as illustrated in FIG. 7) is due to the depletion of the cathode 12 as the lamp ages. Thus, the tip of the cathode as well as the hot spot adjacent the tip of the cathode shift to the right in FIG. 6 as atoms of the cathode are torn away by action of the flow of electrons from the cathode to the anode during operation of the lamp.

Another reason for the decrease in light intensity with time is that the atoms that are torn away from the cathode by the arc-discharge current are then deposited over time onto the inner surface of the glass envelope of the light source and, in the case where a reflector is made integral with the light source and within the glass envelope, then are deposited on the reflector surfaces as well. These soot-like deposits build up on the reflector and on the interior surface of the glass envelope and increasingly block more light from being incident on the light guide end as the lamp ages. Also, the spacing between the cathode and the anode tends to increase as the cathode is depleted and this can reduce the luminosity of the arc discharge as the lamp ages.

Whereas a change in position of the hot spot resulting from depletion of the cathode has only a small affect on the amount of light coupled into a light guide of large diameter, a similar change in position of the hot spot in the case where the light guide is of narrow diameter (3 mm or less) has been found to cause a remarkable degradation in the quantity of light in the light guide. Prior to the present invention, variation in quantity of light input to an end of a light guide has been especially troublesome for light guides having an outer diameter 3 mm or less as a lamp in the lighting system ages. Of course, any significant variation in light intensity in a lighting system of an endoscope is undesirable.

BRIEF SUMMARY OF THE INVENTION

The present invention provides a new and useful lamp design in a lighting system for light guides which overcomes this problem.

A first object of the present invention is to stabilize the quantity of light that is input to an end of a light guide by a lighting system for light guides, over the lifetime of an arc-discharge, sealed-beam type lamp, irrespective of the diameter of the light guide that may be selectively used with the endoscope.

A second object of the present invention is to provide a method of positioning the cathode of an arc-discharge lamp relative to a focal position of a reflector that is used to gather light from a luminescent region of the arc-discharge lamp. The method is applicable not only to sealed-beam type arc-discharge lamps (ones where the reflector is made integral with the lamp by being positioned within the sealed transparent envelope of the lamp), but also to other lamp types, such as where the reflector and lamp are separate units that are positioned within the lighting system for light guides.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

In a lighting system for an endoscope, the amount of light that is incident on the end of a light guide depends on the intensity of light rays that are emitted by a light emitting region of an arc-discharge lamp used to illuminate the end of the light guide, the spatial configuration of a reflector used to gather light from the lamp and to reflect the light to the end of the light guide. In the case where a condensing optical system is employed to condense the light from the reflector before it is incident on the end of the light guide, the amount of light that is incident also depends on the scale factor of the condensing optical system. In order to input as much light as possible into an end of a light guide of narrow diameter, a light gathering reflector and a condensing optical system are generally used and they must efficiently image the hot spot onto the end of the light guide.

Figure 6:
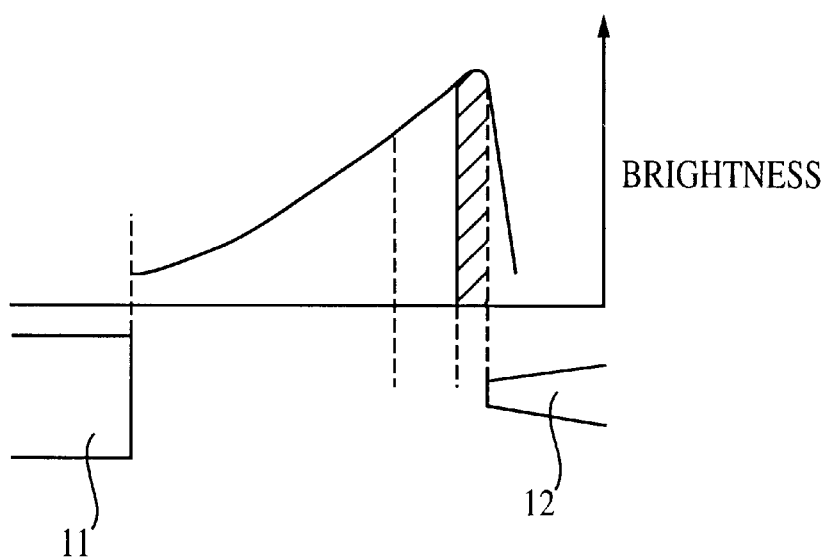
FIG. 6 is a graph which shows the brightness (intensity) of light emitted in a region near an anode and a cathode of an arc-discharge light source as a function of position along a line drawn between the anode and cathode, with the shape and x-axis position of the anode and cathode being illustrated below the abscissa of the graph.

FIG. 6 is a graph which shows the brightness of light emitted by an arc-discharge lamp as a function of position along a fine drawn between the anode 11 and cathode 12 of the arc-discharge lamp, with the shape and position of the anode 11 and cathode 12 being illustrated below the abscissa of the graph. As shown in the figure, the highest light intensity occurs adjacent the tip of the cathode 12 (i.e, the portion nearest the anode 11), and decreases steadily as the anode 11 is approached. The hot spot of the emitted light is indicated in FIG. 6 by slanted lines.

In a conventional lighting system for a light guide, the light that is discharged from the hot spot is condensed into an image of relatively large diameter on the end of the light guide as a result of the hot spot being positioned at a location shifted from the focal position of the reflector in the direction opposite the reflector surface (i.e., along the optical axis of the reflector in a direction away from the reflector). The reason the hot spot of the lamp is not positioned at the focal point of the reflector is to enable the light that is emitted in the region between the hot spot and the anode 11 to also be incident onto the end of the light guide. In this manner, for light guides of relatively large diameter, a maximum amount of light is input to the end of the light guide by having the hot spot position somewhat removed from the focal position of the reflector.

Figure 8:
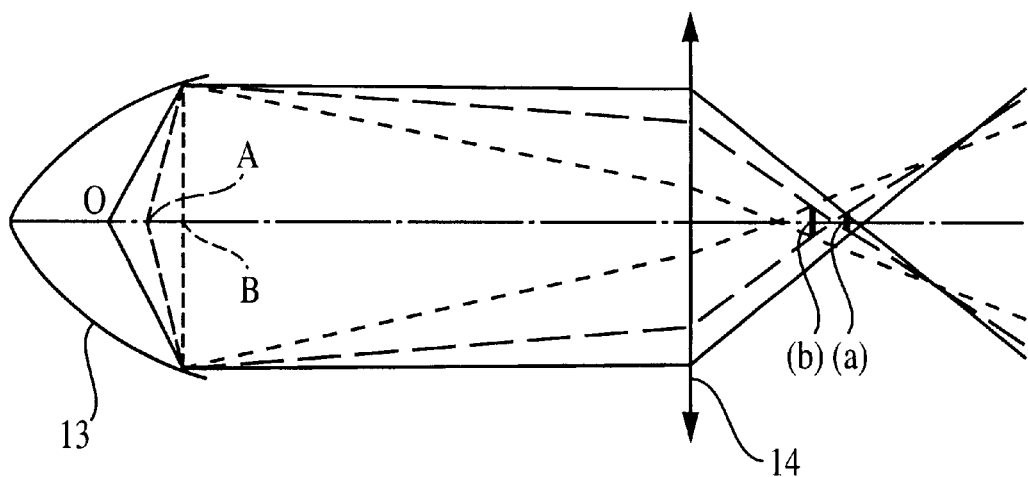
FIG. 8 shows how the diameter of an image of the hot spot of an arc-discharge lamp, as formed by an optical system which includes a parabolic reflector (which may be integral with the lamp) and condensing lens, varies as a function of the axial position of the hot spot relative to the focal point of the parabolic reflector.

FIG. 8 shows an example of a light source device using a parabolic reflector 13 as the reflector. The longer dashes (of the two pairs of differently dashed lines) illustrate the image formation at (a) of the hot spot when the hot spot is positioned at point "A". A condenser lens is illustrated at 14. The shorter dashes (of the two pairs of differently dashed lines) illustrate the image formation at (b) of the hot spot when the hot spot is positioned at point "B", where B is positioned on the optical axis of the reflector somewhat more removed from the focus O of the reflector than is point A, and in the direction away from the reflector. As illustrated, the images at (a) and (b) of the hot spot increase in diameter the farther the position of the hot spot (at A or B) is removed from the focus O of the reflector. In other words, the more the position of the hot spot is removed from the focus O of the reflector, the more the diameter of the condensed image of the hot spot increases.

When the light guide diameter equals or exceeds the diameter of the condensed image of the hot spot, and the numerical aperture of the cone of rays forming the condensed image is less than the numerical aperture of the light guide, light is efficiently coupled into, and guided by, the light guide. Thus, in the conventional arrangement using a light guide of large diameter, a problem does not arise in that the light guide is of sufficient diameter and has a sufficient numerical aperture to receive all of the input light and to guide the light without leakage. In this manner light not only from the hot spot, but also from the light emitting region between the hot spot and the anode, is input to the light guide and is efficiently guided so as to produce a maximum amount of illumination for the endoscope.

However, with this arrangement (i.e., with the hot spot shifted a relatively large amount from the focal position of the reflector so that most of the light radiated in the region between the hot spot and the anode is input into the light guide), the condensed image of the hot spot may exceed the diameter of the light guide end, in the case where the light guide being used is of narrow diameter. Thus, it is desirable to position the hot spot of the lm nearer the focal position O of the reflector, thereby making the diameter of the condensed image of the hot spot smaller. In this way the condensed image of the hot spot may be made to fall entirely within the input aperture of the end of the light guide, even when the light guide being used is of narrow diameter.

Although the prior art has recognized that the aging of a lamp used to illuminate a light guide causes a decrease in light intensity that is input to the light guide, the solution to this problem has conventionally been to increase the input power to the lamp with time in order to compensate for the reduction in lamp output as the lamp ages.

Figure 7:
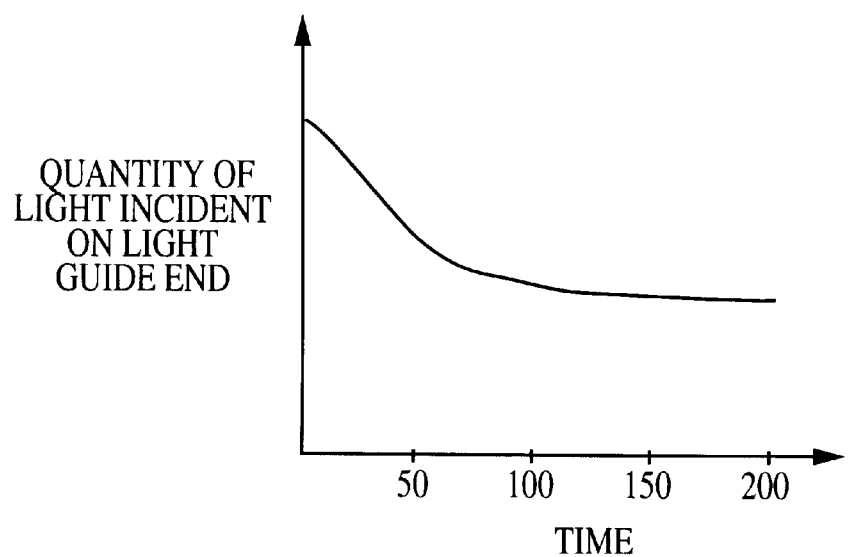
FIG. 7 is a graph which shows the quantity of light incident on a light guide end having a narrow outer diameter (less than 3 mm) versus time as the lamp ages in the case where an arc-discharge lamp is used to illuminate the light guide.

Prior to the present invention, it has not been recognized that depletion of the cathode of an arc-discharge type lamp causes the hot spot produced by the lamp to move in position as the lamp ages, and that such movement results in the steep decline in quantity of light illustrated in FIG. 7. Thus, the present inventors are the first to recognized that the hot spot moves as the lamp ages and that this causes a problem in the illumination of light guides having a narrow diameter.

In order to obtain a more stable amount of light incident a light guide end over the lifetime of an arc-discharge lamp used to illuminate light guides, the present invention positions the hot spot relative to the focal position of the reflector in a manner which compensates not only for movement of the hot spot as the lamp ages but also for the lamp output itself decreasing with time. Such a decrease in light output is attributable to various factors, such a soot-like deposits and an increase in spacing between the electrodes, etc., as the lamp ages. In this way the light input to the light guide is stabilized so as to be much less variable as the lamp ages. By anticipating the movement of the hot spot as well as the decrease in output of the lamp resulting from the lamp aging process, a variation in the amount of light incident onto the end of the light guide is stabilized. This is accomplished by positioning the tip of the cathode, when the lamp is new relative to a focal position of a reflector used to gather light from the lamp, differently than in the prior art.

The proper positioning of the lamp of the light source according to the present invention is given by:

$$P_0 = P_M(D) + \delta[P_0 - P_t)/2]$$ Condition 1 where $P_0$ is the position vector of the lamp cathode tip in an initial state, with the base of the position vector $P_0$ being an origin point, defined by the intersection of a reflector surface used to gather light from the lamp and the optical axis of the reflector surface, of an otherwise arbitrary coordinate system;

$P_M(D)$ is the position vector, in said coordinate system, of the lamp cathode tip position which provides a maximum amount of light to a light guide of diameter D, Pt is the position vector, in said coordinate system, of the lamp cathode tip after the cathode has been depleted for a time equal to the expected operating life of the lamp (e.g., for the life guarantee period of the lamp, since the lamp of an illumination system of an endoscope is usually replaced near this point in time), and $\delta$ is a coefficient in the range $0.5 \leq \delta \leq 1.5$.

The optimum value in the range $0.5 \leq \delta \leq 1.5$ for coefficient 8 is determined on a case-by-case basis, based on measurements taken for the particular diameter light guide and the particular arc-discharge lamp type in use. The optimum value of $\delta$ is the value which produces, over the operating life of the lamp, the most stable incident light intensity on the light guide end. The diameter of the light guide end used in this determination, in the case where multiple light guides may be selectively attached to the light guide illumination system of the invention, is the diameter of the most narrow light guide that will be used with the light guide illumination system Thus, the preferred embodiments of the invention are the light guide illumination systems as illustrated in the first and second embodiments wherein 6 is selected to have a specific value within the range $0.5 \leq \delta \leq 1.5$, the specific value selected being the one which produces the most stable quantity of light over the life of the lamp. Thus, $\delta$ is determined by experiment, and examples will be discussed with regard to Tables I and II below so as to teach one of ordinary skill how to practice the preferred embodiments of the invention.

Figure 1:
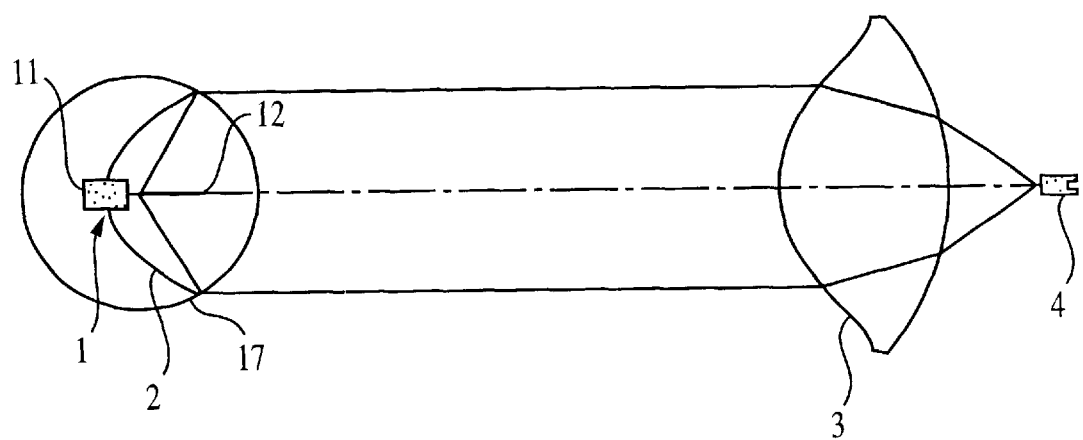
FIG. 1 shows a first embodiment of the lighting system of the present invention.

FIG. 1 shows a first embodiment of the invention. A light source 1 has two direct current arc-discharge electrodes, including an anode 11 and a cathode 12. A reflector 2 having a parabolic surface may be provided integrally with the light source 1 (i.e., as a sealed beam lamp, with the reflector within a transparent enclosure 17). Alternatively, the reflector 2 may be separately provided outside the transparent enclosure. The direction between the electrodes in this embodiment corresponds to the axis of symmetry of the reflector 2 (ie., the optical axis). Emitted light that has been reflected by reflector 2 is refracted by a condenser lens 3 and condensed so as to be incident on an end of the light guide 4. And, the numerical aperture of the cone of rays NA1 from the condenser lens 3 is less than the numerical aperture NA2 of the light guide. For small light guides, the light source image is larger than the diameter of the end of the light guide, and thus light is wasted.

In order to increase the quantity of light incident on a light guide end of thin diameter in the first embodiment of the invention, it is necessary to shorten the focal length of the condenser lens so as to increase the numerical aperture of the light incident the end of the light guide. This increases the manufacturing costs, as the lens becomes more difficult to manufacture.

Figure 2:
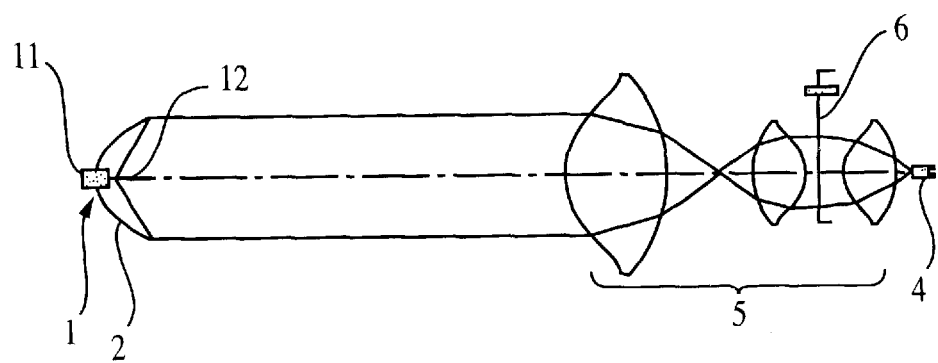
FIG. 2 shows a second embodiment of the lighting system of the present invention.

FIG. 2 shows a second embodiment of the lighting system according to the invention. FIG. 2 differs from FIG. 1 in that a condenser-lens group 5 consisting of three lens elements is provided in lieu of a single condenser lens and is positioned before the end of the light guide. This enables the numerical aperture of the condensed light to be increased without requiring an expensive lens element of short focal length to be manufactured. The condenser lens group 5 also enables light from the hot spot to be condensed into a smaller region, which is advantageous for illuminating a light guide of narrow diameter. In this embodiment, the numerical aperture NA1 of the cone of rays from the condenser lens 3 is made greater than or equal to the numerical aperture NA2 of the light guide. Ideally, NA1 is made equal NA2 and, additionally, the diameter of the condensed light from the hot spot equals the diameter input aperture of the light guide. As shown in this embodiment the lighting system may also include one or more filters, such as dichroic filter 6, in order to control the type, amount, etc., of light entering the light guide.

The second embodiment of the invention enables a larger quantity of light to be input to a narrow diameter light guide with less reduction in intensity due to aging of the light source, since light from the hot spot is condensed into a smaller region. Therefore, even with the shifting of the hot spot as a result of aging, a greater percentage of the condensed light will fall within the input aperture of the end of the guide.

Figure 3:
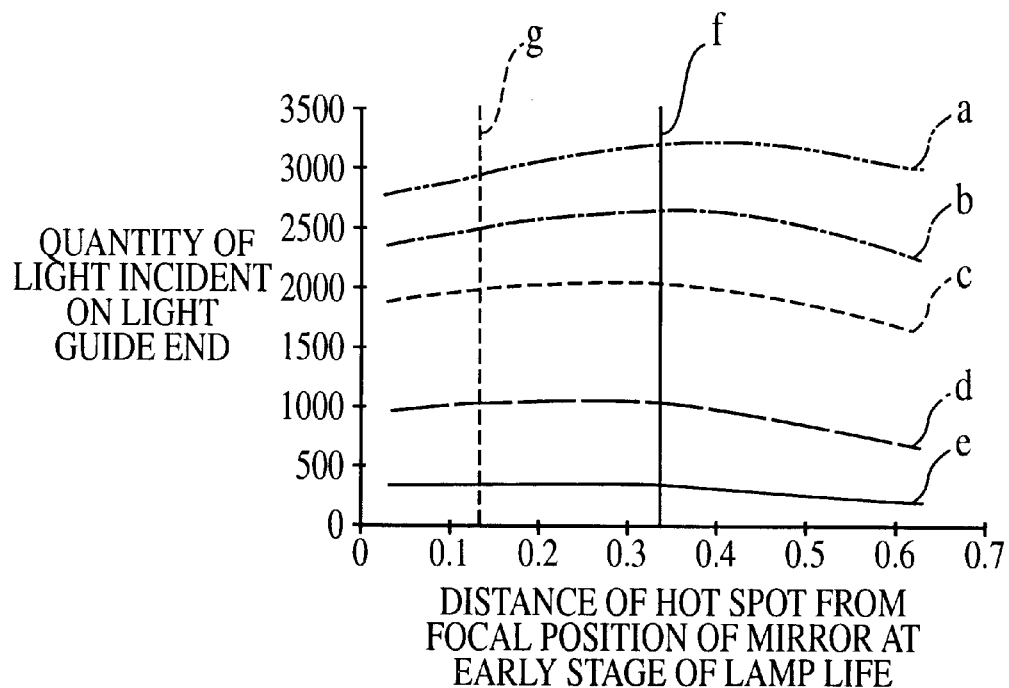
FIG. 3 shows the relationship, for the lighting system according to the first embodiment of the invention and for light guides a–e of various outside diameters, between the quantity of light incident on a light guide end versus the distance of the hot spot from the focal position of the reflector, with the displacement direction being along the optical axis of the reflector and away from the reflector.

FIG. 3 shows, for the first embodiment of the invention, the quantity of light incident on a light guide end as a function of the distance the hot spot is displaced (in a direction along the axis, and away from the reflector surface), at the start of lamp life, from the focal position of the reflector. The different curves labeled "a" through "e" are for light guides having an outer diameter of 4.5 mm, 3.4 mm, 2.6 mm, 1.5 mm, and 0.8 mm, respectively. Vertical line "f" illustrates the distance of the hot spot in a conventional lighting system at the beginning of lamp life, wherein the hot spot is positioned 0.33 mm from the focal position of the reflector and in a direction along the axis that is away from the reflector surface.

For a given curve in FIG. 3, as the lamp ages, the hot spot will move along the curve to the right, since the depletion of the portion of the cathode nearest the anode will move the hot spot to the right and thus farther from the focal position of the reflector (i.e., in a direction along the optical axis that is away from the reflector).

As can be seen in FIG. 3, the abscissa values of the maxima of the curves (a)–(e) increase as the light guide diameters increase. The abscissa value of the maxima for a light guide of diameter 3.4 mm (curve (b)) is 0.33 mm, which corresponds to the distance of the hot spot in a conventional lighting system at the beginning of lamp life. For larger diameter light guides, the maximum quantity of light on the light guide end occurs to the right of vertical line (f). Thus, for a conventional lighting system, wherein the hot spot is positioned 0.33 mm away from the focal position of the reflector at the start of lamp life, the light on the end of light guides of diameter 3.4 mm or thicker will increase as the lamp begins to age. However, as discussed previously with regard to FIG. 8, as the light guide diameter decreases, the desired position of the hot spot at the beginning of lamp life should approach the focal position of the reflector, so that the diameter of the image of the hot spot falls entirely within the input aperture of the light guide end. Thus, the maximum of curve (c) occurs at a position less than the abscissa value of 0.33, the maximum of curve (d) occurs at an abscissa value of 0.23, and the maximum of curve (e) occurs at an abscissa value of 0.18.

Therefore, if the position of the hot spot from the focal position at the start of lamp operation is set to correspond to the abscissa position of vertical line (f), i.e., 0.33 mm, the quantity of light incident on the light guide end of a light guide having a diameter of 3.4 mm (curve (b)) will be mated. However, as the lamp ages the intensity will decrease from this maximum.

In applicants' invention the hot spot is set to a different position relative to the focal position of the reflector, a position which takes into account the movement of the hot spot with aging of the lamp, as well as the need to position the hot spot nearer the focal position of the reflector for smaller diameter light guides so that the image of the hot spot can be made to fall within the input aperture of the smaller diameter light guide.

For example, consider the situation when the diameter of a light guide is 1.5 mm (curve (d), having its maximum at an abscissa value of 0.23 mm), given that the movement of the hot spot with aging of the lamp (from the beginning of lamp operation until its expected replacement at the end of its guarantee period) will be 0.2 mm. Positioning the hot spot at an abscissa value of 0.23 mm at the start of lamp operation results in the hot spot being at an abscissa value of 0.43 mm after aging. Thus, as shown in FIG. 3, the quantity of light will decrease, and the reduction of the quantity of light input the fiber end with aging cannot be suppressed. In order to avoid this, the initial position of the hot spot from the focal position of the mirror is shifted to an abscissa value of 0.13 mm, as shown by vertical line (g) in FIG. 3. Thus, at the beginning of lamp operation, the hot spot is at abscissa position 0.13 mm and, at the end of the guarantee period of the lamp, the hot spot is at abscissa position 0.33 mm (at vertical line (f)). At mid-life, it is positioned near the maximum abscissa position. In this manner, the variation in intensity of light input the fiber end over the life of the lamp is minimized. The intensity on the end of the fiber gradually rises as the maximum of the curve is approached during the first half of guaranteed lamp life, and then gradually decreases during the second half of guaranteed lamp life.

Referring once more to Condition (1) above, intuitively one would expect a value of δ=1 to be selected so that the hot spot is at the position of maximum intensity when the lamp is at its mid-life, since the hot spot would thereby be positioned, over the life of the lamp, nearest the region that the curve has zero slope. The larger range of δ accounts for the light intensity of the lamp decreasing due to other factors, such as an increase in spacing between the electrodes and for soot-like deposits, as discussed earlier. In this way, the optimum light source device may be obtained for an endoscope having a light guide of thin diameter without having to shorten the focal distance of the condenser lens.

In order to increase the amount of light incident on the end of the light guide having a thin diameter, one may make the focal distance of the condenser lens short so as to increase the numerical aperture (ie., the cone angle) of the incident rays. This is worthwhile up to the point that the light guide is capable of guiding such rays. After a maximum cone angle is reached, for a given design of light guide, rays of greater cone angle that are input to the end of the light guide are not guided by the light guide and instead leak from the light guide.

In addition, the accuracy of assembly becomes more critical. When the focal distance of a condenser lens is shortened, the curvature of the condenser lens surface increases and it becomes more difficult to manufacture such a lens. The lighting system of the present invention improves the illumination on an end of a light guide without changing or modifying the condenser lens.

Table 1 shows, for the first embodiment of the invention and for various values of δ, the ratio of light flux in the light guide at the beginning of amp life and after aging the guaranteed lamp life, for light guides of diameter 0.8 mm, 1.5 mm, and 2.6 mm, with $P_M$ normalized.

TABLE 1

|  | This Invention with δ = | | | | | Prior Art Example |
|---|---|---|---|---|---|---|
|  | 0 | 0.5 | 1 | 1.5 | 2 |  |
| (1) Light guide with a diameter of 0.8 mm | | | | | | |
| Ratio of light flux in light guide at beginning to $P_M$ (0.8): | 100% | 99% | 97% | 94% | 88% | 93% |
| Ratio of light flux in light guide after aging to $P_M$ (0.8): | 78% | 86% | 92% | 98% | 100% | 64% |
| (2) Light guide with a diameter of 1.5 mm | | | | | | |
| Ratio of light flux in light guide at beginning to $P_M$ (1.5): | 100% | 99% | 98% | 95% | 90% | 97% |
| Ratio of light flux in light guide after aging to $P_M$ (1.5): | 88% | 92% | 96% | 99% | 100% | 76% |
| (3) Light guide with a diameter of 2.6 mm | | | | | | |
| Ratio of light flux in light guide at beginning to $P_M$ (2.6): | 100% | 99% | 99% | 97% | 94% | 99% |
| Ratio of light flux in light guide after aging to $P_M$ (2.6): | 92% | 96% | 98% | 99% | 100% | 89% |

In the case of a light guide with a diameter of 0.8 mm, when δ equals 0, the quantity of light at the beginning of lamp life is the most advantageous, as seen from Table 1, above. However, the quantity of light after aging is reduced remarkably. Although the quantity of light after aging is the most advantageous when δ equals 2, the quantity of light at the beginning of lamp life is greatly reduced. However, the quantity of light at the beginning of lamp life and after aging can be acceptably stabilized by selecting a value of δ within the limits 0.5<δ<1.5.

As mentioned above, if the value of δ is set within the limits of the above-mentioned conditions in the lighting system of the first embodiment according to this invention, the quantity of light at the beginning of lamp life can be increased in a light guide with a diameter of 0.8 mm, with only a slight reduction in quantity of light after aging. Thus, the lighting system of this invention can greatly stabilize the light that is input to a light guide of an endoscope over the life-guarantee period of the lamp as compared with the prior art example.

Thus, by selecting δ based on experimental data and in the range of 0.5–1.5, in the lighting system of the first embodiment according to this invention, the quantity of light at an early stage of lamp life can be increased in a light guide with a diameter of 0.8 mm, and the variation in quantity of light incident on the light guide end as a result of aging of the lamp can be made small.

For example, it is effective if the hot spot is positioned at an abscissa value of 0.13 mm from the focal position of the reflector (ie., δ=1)

This can be accomplished by selecting the lamp design based on the most narrow diameter light guide that the lamp will be used to illuminate. The beneficial effect of the present invention deceases as the diameter of the light guide increases, as is clearly seen from Table 1 above. Moreover, if the design of the lamp performs optimally for the light guide having the most narrow diameter as shown in FIG. 3, the shift in the hot spot with aging will be useful even when the lamp is used to illuminate a light guide of a large diameter.

FIG. 2 is a diagram showing the second embodiment of the lighting system according to the present invention. This embodiment provides a condenser lens group 5 which consists of three lens elements that are positioned before the end of the light guide. The numerical aperture NA1 of the illumination from the final lens element of the condenser lens group 5 exceeds the numerical aperture of the light guide NA2. Although light leakage in the light guide occurs, this embodiment is useful in illuminating small diameter optical light guides. Also, the lighting system of the second embodiment provides for a system which allows for one or more filters, 6, such as a dichroic filter, to be inserted in the light path. Moreover, the diameter of the filter(s) and the size of the hot spot is smaller in this embodiment as compared with the first embodiment, which does not employ a condensing lens group. Therefore the diameter of the image of the hot spot is small and allows a light guide end of even a smaller diameter to be illuminated without wasting light by having the light fall partially outside the input aperture end of the light guide.

Because of the small diameter of the image of the hot spot in the second embodiment, this embodiment is not as easily affected by the aging of the light source, since an enlarging of the image of the hot spot by movement of the hot spot position as illustrated in FIG. 8, will not as easily cause the image of the hot spot to fall outside the input aperture of the light guide.

Figure 4:
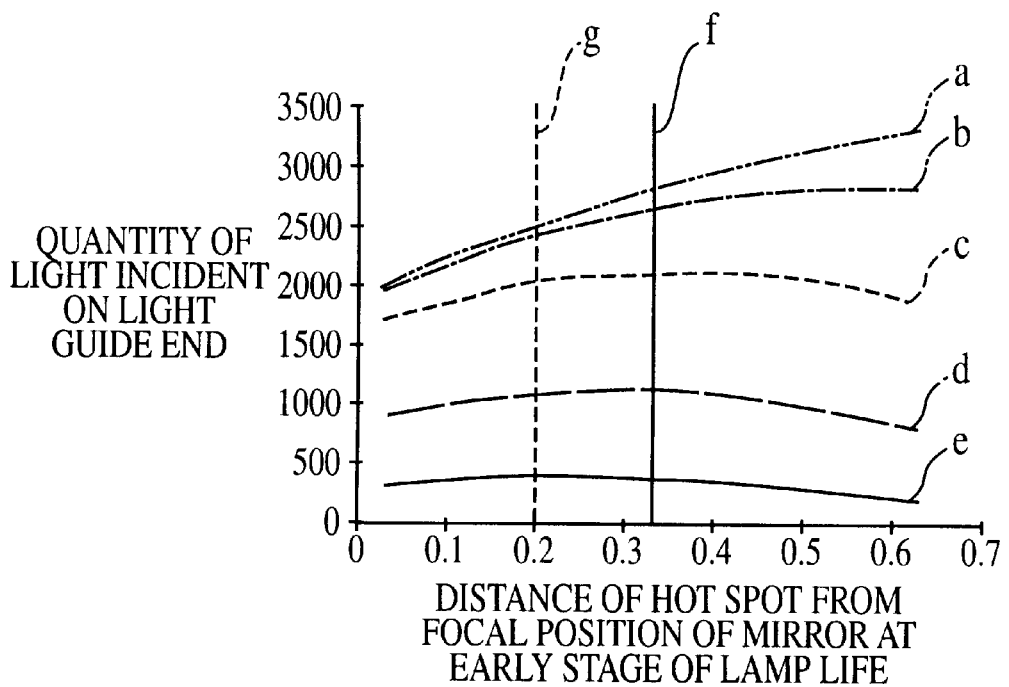
FIG. 4 shows the relationship, for the lighting system according to the second embodiment of the invention and for light guides a–e of various outside diameters, between the quantity of light incident on a light guide end versus the distance of the hot spot from the focal position of the reflector, with the displacement direction being along the optical axis of the reflector and away from the reflector.

FIG. 4 shows, for the second embodiment of the invention, the quantity of light incident on a light guide end as a function of the distance the hot spot is displaced (in a direction along the axis, and away from the reflector surface), at the start of lamp life, from the focal position of the reflector. The different curves labeled "a" through "e" are, once again, for light guides having an outer diameter of 4.5 mm, 3.4 mm, 2.6 mm, 1.5 mm, and 0.8 mm, respectively. Vertical line "f" again illustrates the distance of the hot spot in a conventional lighting system at the beginning of lamp life, wherein the hot spot is positioned 0.33 mm from the focal position of the reflector and in a direction along the axis that is away from the reflector surface. Vertical line "g" illustrates the hot spot positioned at abscissa value of 0.2 mm from the focal position of the mirror at the early stage of lamp life. With the hot spot positioned initially at vertical line "g", the change in light intensity with aging for a light guide of diameter 1.5 mm is small (δ=1.4), and for a light guide of diameter 0.8 mm the optimum configuration to reduce the change in light intensity with aging is obtained (δ=0.9), without dropping the quantity of light at the beginning of lamp life operation. The shape of the curves (a)–(e) are different because of the addition of the condensing optical system 5. However, further detailed explanation of this embodiment win be omitted since the figure otherwise is similar to FIG. 3, above.

Figure 5A:
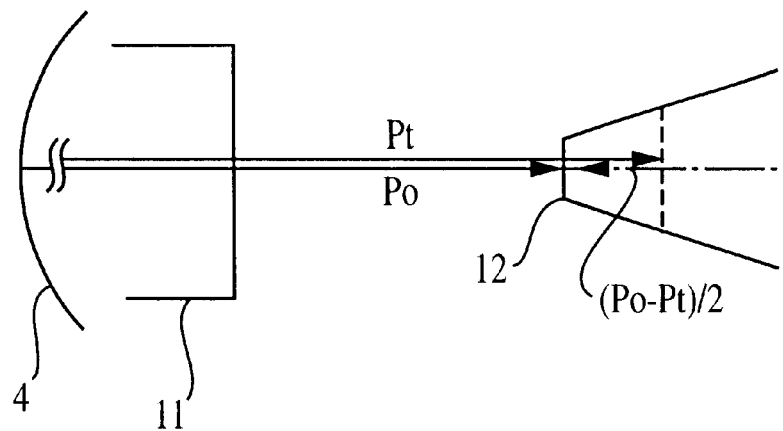
FIGS. 5(a) and 5(b) show the position vector of the tip of the cathode at the beginning of lamp life and after a lamp guarantee period in the case where the anode and cathode of an arc-discharge lamp are aligned with the optical axis of the reflector (FIG. 5(a)), and in the case where the anode and cathode and of an arc-discharge lamp are positioned along a line that is normal to the optical axis of the reflector (FIG. 5(b))

FIG. 5(a) shows the position vector of a cathode at the beginning of lamp life Po and after a lamp guarantee period Pt in the case where the anode 11 and cathode 12 of an arc-discharge lamp are positioned aligned with the optical axis of the reflector 4. Also illustrated is the vector (Po–Pt)/2, showing the direction and distance the tip of the electrode is shifted (from the head of the vector Po) if the value of δ is selected as 1.0. Whereas selecting the value of δ equal to 1.0 fully compensates for movement of the hot spot due to depletion of the cathode, this value does not compensate for any lowering in the output of the lamp as a result of the spacing between the anode and cathode increasing or for soot deposits building up as the lamp ages.

Figure 5B:
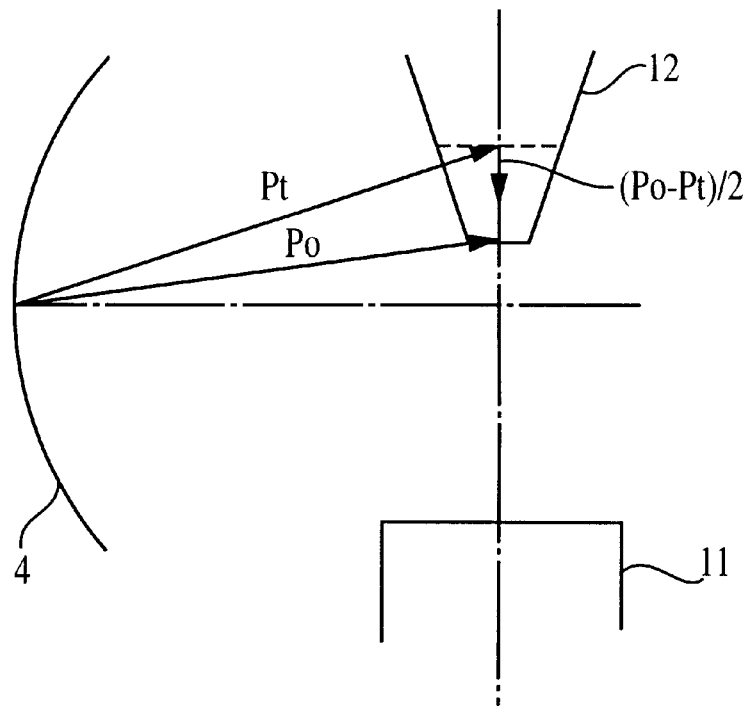

FIG. 5(b) shows the position vector of a cathode at the beginning of lamp life Po and after a lamp guarantee period Pt in the case where the anode 11 and cathode 12 of an arc-discharge lamp are positioned so that the line between anode 11 and cathode 12 is perpendicular to the optical axis of the reflector 4. Also illustrated is the vector (Po–Pt)/2, showing the direction and distance the tip of the cathode 12 is shifted (from the head of the vector Po) if the value of δ is selected as 1.0. As in FIG. 5(a), whereas selecting the value of δ equal to 1.0 compensates for movement of the hot spot due to depletion of the cathode, this value does not compensate for any lowering in the output of the lamp (such as results from soot deposits or from the spacing between the electrodes increasing). In this embodiment, due to the stronger condensing lens group 5 the hot spot is condensed to a smaller region in this embodiment. For this reason, the cathode can be positioned to gather more light from the region to the left of the hot spot in FIG. 6. This is accomplished by moving the initial cathode position farther away from the surface of the mirror (i.e., toward the end of the light guide) until such point that the luminous flux diameter of the image of the hot spot equals the input aperture diameter of the light guide. Thus, in this embodiment the cathode is positioned at the start of lamp life further to the right than in the first embodiment, and in fact is positioned at the start of lamp life so that the light input to a light guide of diameter 1.5 mm is a maximum Table 2 shows, for the second embodiment of the invention and for various values of δ, the ratio of light flux in the light guide at the beginning of lamp life and after aging the guaranteed lamp life, for light guides of diameter 0.8 mm, 1.5 mm, and 2.6 mm, with $P_M$ normalized.

TABLE 2

|  | This invention when δ = | | | | | Prior Art Example |
|---|---|---|---|---|---|---|
|  | 0 | 0.5 | 1.0 | 1.5 | 2 |  |
| (1) Light guide with a diameter of 0.8 mm | | | | | | |
| Ratio of light flux in light guide at beginning to $P_M$ (0.8): | 100% | 98% | 94% | 89% | 83% | 99% |
| Ratio of light flux in light guide after aging to $P_M$ (0.8): | 78% | 85% | 92% | 97% | 100% | 71% |
| (2) Light guide with a diameter of 1.5 mm | | | | | | |
| Ratio of light flux in light guide at beginning to $P_M$ (1.5): | 100% | 98% | 96% | 93% | 88% | 100% |
| Ratio of light flux in light guide after aging to $P_M$ (1.5): | 85% | 89% | 94% | 98% | 100% | 85% |

As shown by the above Table 2 and the vertical line (f) in FIG. 4, the position of the hot spot for the prior art example listed in the table is set at abscissa value 0.33, which corresponds to the maximum of the curve d in FIG. 4. At this positioning of the hot spot Po=$P_M$. In other words, (from Condition 1) δ in the prior art example listed in Table 2 is set at zero. With this position of the hot spot relative to focal position of the reflector, although a sufficient quantity of light is obtained at the beginning of lamp fife, a decrease in quantity of light with aging cannot be suppressed, (note that it falls to 85% after aging). For this reason, as shown by vertical line "g" of FIG. 4, the portion of the cathode nearest the anode is arranged so that the hot spot is positioned 0.2 mm from the focal position of the reflector, in a direction along the optical axis from the focal point that is away from the reflector surface. For the most narrow light guide diameter (0.8 mm) to be used with this light guide illuminator, it turns out from testing that the maximum stabilization of quantity of light on the fiber end occurs at δ=0.9. (This is consistent with Table 2, where it appears that δ=1.0 gives the greatest stabilization of the integer and half-integer values of δ that are listed in the Table. And, only a slight reduction in the quantity of light upon aging of the lamp is obtained for a light guide of a diameter of 0.8 mm by setting δ equal to 0.9. Thus, the preferred value for δ within the range 0.5≦δ1.5 for this embodiment is 0.9, since this value of δ provides the greatest stabilization in quantity of light over the guarantee period of the lamp for the most narrow light guide to be illuminated by the light guide illumination system of the second embodiment of the invention.

The light guide lighting system of the present invention may be used to illuminate light guides of multiple different diameters, as was explained in discussing the first embodiment of the invention. When it is unknown what the diameter of the light guide will be, it is best to position the hot spot of the light source relative to the focal position of the reflector based on the design that stabilizes the quantity of light best for the most narrow diameter light guide to be used with the light guide lighting system.

The diameter of the most narrow light guide to be used with an endoscope is typically less than 3 mm. Moreover, in the light guide lighting system of the above-mentioned first and second embodiments, in order to reduce heat generation near the end of the light guide and reduce the size of the lighting system by avoiding use of the condenser lens system, the following components are desirable.

The lighting system of the present invention preferably includes an arc-discharge type light source, a reflector having a parabolic surface arranged behind the light source, and a condenser lens group which consists of at least one lens element in order to condense the radiated light from a lamp onto a light guide end, and for the following conditions (2)–(4) to be satisfied:

$3 \leq f_1 \leq 4$      Condition (2)

$0.8 \leq \sin(\tan^{-1}((D_S/f_S) \times 0.5))/\text{NA2} \leq 1.2$      Condition (3)

$0 \leq B \leq 0.2$      Condition (4)

where
$f_1$ is the focal distance of the reflector,
$f_S$ is the focal distance of the final lens element of the condensing optical system,
$D_S$ is the diameter of the luminous flux at the final lens of the condensing optical system,
NA2 is the numerical aperture of the light guide, and
B is the distance between the focal position of the reflector and the tip of the cathode (i.e., the portion that is nearest the anode).

Condition (2) above regulates the shape of a parabolic surface of the reflector. If $f_1$ is below the lower limit value listed, the radiated light from the light source cannot be efficiently condensed. In order to obtain the quantity of light sufficient to illuminate the light guide properly, the parabolic surface must be deep and thus the overall length must be long. Moreover, if $f_1$ exceeds the upper limit value listed, in order to obtain a sufficient quantity of light, the input aperture of the reflector of the parabolic surface needs to be enlarged. For this reason, the condenser lens group must be increased in size. Thus, a lighting system cannot be obtained which is of small size unless it satisfies Condition (2).

Condition (3) regulates the numerical aperture of the light guide NA2 versus the numerical aperture of the luminous flux from the final condensing lens NA1. If the lower limit of Condition (3) is not satisfied, the condensing density of light condensed by the condenser-lens group 5 will be low. In this case, because the light source image (spot diameter) is relatively large due to the condenser lens, there is a favorable construction for a large diameter light guide. However, the convergence density of the light is low for illuminating a narrow diameter light guide. Thus, in the case where a light guide of narrow diameter is used, a sufficient quantity of incident light on the end of the light guide will not be obtainable. If the upper limit of Condition (3) is exceeded, the condensing density of the condensing lens group will be high. For this reason, a sufficient quantity of incident light will be obtainable. However, the numerical aperture of the incident beam wilt be larger than the numerical aperture of the light guide, resulting in leakage of the light from the light guide. The leaked light will cause heat to be generated and may result in faults on the light guide, such as scorching of the light guide end face.

Condition (4) regulates the position of the cathode. If the value of B is below the lower limit of zero, the quantity of light loss after aging will be small. However, for a light guide of thin diameter, a sufficient quantity of light at the beginning of lamp life will not be obtained. If the value of B exceeds the upper limit of 0.2, the quantity of light loss from aging will be large, and the objective of the invention will not be obtained.

The present invention allows the amount of light incident a narrow diameter light guide over the life of the lamp to be increased, while not adversely affecting the amount of light incident on a larger diameter optical light guide.

The invention being thus described, it will be obvious that the same may be varied in many ways. The lighting system of the present invention is not limited to the above-described first and second embodiments. For example, the condensing lens system may be omitted, and the reflector may be an ellipsoid rather than a parabolic surface. Further, the lamp type is not limited to an arc-discharge lamp, or a direct current lamp for that matter, as the invention is applicable to any lamp type which has its position of maximum luminosity shift in position as the lamp ages. Rather the scope of the invention shall be defined as set forth in the following claims and their legal equivalents. All such modifications as would be obvious to one skilled in the art are intended to be included within the scope of the following claims.

What is claimed is:

1. A lighting system for a light guide comprising:
   an arc-discharge-type light source;
   a reflector having a parabolic reflecting surface which is arranged behind the light source; and,
   an optical system for condensing light from the light source onto an end of a light guide, wherein
   the lighting system satisfies the following conditions $$3 \leq f_1 \leq 4$$

$$0.8 \leq \sin(\tan^{-1}((D_S/f_S) \times 0.5))/NA2 \leq 1.2$$

$$0 \leq B \leq 0.2$$

where
   $f_1$ is the focal distance of the reflector,
   $f_S$ is the focal distance of the final lens element of the condensing optical system,
   $D_S$ is the diameter of the luminous flux at the final lens of the condensing optical system,
   NA2 is the numerical aperture of the light guide, and
   B is the distance between the focal position of the reflector and the tip of the cathode.

2. A lighting system for light guides comprising:
   a light source; and
   an optical system for condensing light from the light source onto an end of a light guide;
   wherein, at the beginning of lamp life operation, the maximum luminescent region of the light source is positioned, as measured from the position that inputs a maximum amount of condensed light into an end of the light guide, in a direction that is opposite the direction the maximum luminescent region of the light source shifts due to aging of the light source.

3. The lighting system of claim 2, wherein the amount of shift is proportional to the distance the maximum luminescent region moves due to depletion of the cathode during a guarantee period of said light source.

4. A lighting system for light guides comprising:
   an arc-discharge light source having a first electrode and a second electrode; and
   a reflector for gathering light from said arc-discharge light source;
   wherein, in an arbitrary coordinate system having an origin defined by the intersection of the surface of said reflector with the optical axis of said reflector, a position vector Po is given by the following condition:

$$Po = P_M(D) + \delta[(Po - Pt)/2]$$

where
   Po is the position vector of the portion of the second electrode that is nearest the first electrode in an initial state of the arc-discharge light source,
   $P_M(D)$ is the position vector of the portion of the second electrode that is nearest the first electrode which provides a maximum quantity of light incident onto a light guide end of diameter D,
   Pt is the position vector of the portion of the second electrode that is nearest the first electrode at a state after the light source has been operated for a guarantee period of the light source, and
   $\delta$ is a factor and lies in the range $0.5 \leq \delta \leq 1.5$.

5. The lighting system of claim 4, wherein said arc-discharge light source is powered by direct current, said first electrode is an anode, and said second electrode is a cathode.

6. The lighting system of claim 4, wherein said reflector is a parabolic reflector.

7. The lighting system of claim 4, wherein said reflector is an ellipsoidal reflecting surface.

8. A lighting system for use in illuminating an end of a light guide, said lighting system comprising:
   a light source having an arc-discharge lamp which has an anode and a cathode, a reflector having a focal position, a sealed transparent envelope which surrounds the reflector, anode and cathode and which contains a gas capable of arc discharge; and
   an optical system for condensing light from the light source onto a small region;
   wherein the cathode of the arc-discharge lamp is arranged relative to the focal position of the reflector so as to provide less than a maximum illumination to the small region at the beginning of lamp life operation, and is instead arranged shifted from the position which provides a maximum illumination to the small region at the beginning of lamp life operation, the shift being in a direction opposite to the direction that a tip of the cathode moves as the cathode is depleted during a guarantee period of the lamp life, thereby reducing a variation in light incident said small region throughout said guarantee period.

9. The lighting system according to claim 8, wherein the amount of shift compensates not only for movement of the cathode tip during a guarantee period of the lamp, but also for the light output of the lamp decreasing with time as the lamp ages.

10. The lighting system of claim 8, wherein said reflector is a parabolic reflector.

11. The lighting system of claim 8, wherein said reflector is an ellipsoidal reflecting surface.

12. A method of illuminating an end of at least one light guide that may selectively be attachable to a lighting system, the lighting system using an arc-discharge type lamp to illuminate an end of an attached light guide, the arc-discharge type lamp having a cathode and an anode and an arc-discharge gas sealed within a transparent envelope and forming part of a lighting system which includes a reflector having a focal position, said method serving to reduce a variation in illumination on the end of the light guide over a guarantee period of the lamp, said method comprising the following step:

arranging the cathode of the arc-discharge lamp relative to the focal position of the reflector so as to be shifted from a position which provides a maximum illumination at the start of lamp life operation, with the direction of shift being in a direction opposite the direction that the portion of the cathode nearest the anode moves as the cathode is consumed during a guarantee period of the lamp.

13. The method of claim 12, wherein the amount of shift is proportional to the distance the portion of the cathode nearest the anode will move during the guarantee period of the light source.

14. The method of claim 12, wherein, when more than one light guide is selectively attachable to the lighting system, the cathode of the arc-discharge lamp is arranged relative to the focal position of the reflector so as to be shifted from a position which provides a maximum illumination at the start of lamp life operation for the most narrow light guide to be selectively attachable to the lighting system.

* * * * *

UNITED STATES PATENT AND TRADEMARK OFFICE
CERTIFICATE OF CORRECTION

PATENT NO. : 6,254,264 B1
DATED : July 3, 2001
INVENTOR(S) : Koshikawa et al.

It is certified that error appears in the above-identified patent and that said Letters Patent is hereby corrected as shown below:

<u>Column 3,</u>
Line 53, change "fine" to -- line --;

<u>Column 4,</u>
Line 48, change "lm" to -- lamp --;

<u>Column 6,</u>
Line 4, change "(ie.," to -- (i.e., --;

<u>Column 7,</u>
Line 25, change "mated" to -- maximized --;

<u>Column 8,</u>
Line 66, change "8" to -- $\delta$ --;

<u>Column 9,</u>
Line 18, change "(ie.," to -- (i.e., --;

<u>Column 10,</u>
Line 20, change "win" to -- will --;
Line 62, change "further" to -- father --;

UNITED STATES PATENT AND TRADEMARK OFFICE
CERTIFICATE OF CORRECTION

PATENT NO. : 6,254,264 B1
DATED : July 3, 2001
INVENTOR(S) : Koshikawa et al.

It is certified that error appears in the above-identified patent and that said Letters Patent is hereby corrected as shown below:

<u>Column 13,</u>
Line 28, change "a light" to -- the light --; and
Line 57, change "amount of shift" to -- position of the maximum luminescent region of the light source at the beginning of light source operation is a distance from the position which provides a maximum amount of condensed light onto an end of a light guide that --.

Signed and Sealed this

First Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,254,264 B1
DATED         : July 3, 2001
INVENTOR(S)   : Koshikawa et al.

It is certified that error appears in the above-identified patent and that said Letters Patent is hereby corrected as shown below:

Column 3,
Line 53, change "fine" to -- line --;

Column 4,
Line 48, change "lm" to -- lamp --;

Column 6,
Line 4, change "(ie.," to -- (i.e., --;

Column 7,
Line 25, change "mated" to -- maximized --;

Column 8,
Line 66, change "8" to -- $\delta$ --;

Column 9,
Line 18, change "(ie.," to -- (i.e., --;

Column 10,
Line 20, change "win" to -- will --;
Line 62, change "further" to -- farther --;

UNITED STATES PATENT AND TRADEMARK OFFICE
CERTIFICATE OF CORRECTION

PATENT NO.    : 6,254,264 B1
DATED         : July 3, 2001
INVENTOR(S)   : Koshikawa et al.

It is certified that error appears in the above-identified patent and that said Letters Patent is hereby corrected as shown below:

<u>Column 13,</u>
Line 28, change "a light" to -- the light --; and
Line 57, change "amount of shift" to -- position of the maximum luminescent region of the light source at the beginning of light source operation is a distance from the position which provides a maximum amount of condensed light onto an end of a light guide that --.

This certificate supersedes Certificate of Correction April 1, 2003.

Signed and Sealed this

Twenty-second Day of July, 2003

JAMES E. ROGAN
*Director of the United States Patent and Trademark Office*